Aug. 1, 1944.  C. E. PETERS  2,354,877
BATTERY CHARGER
Filed June 4, 1941
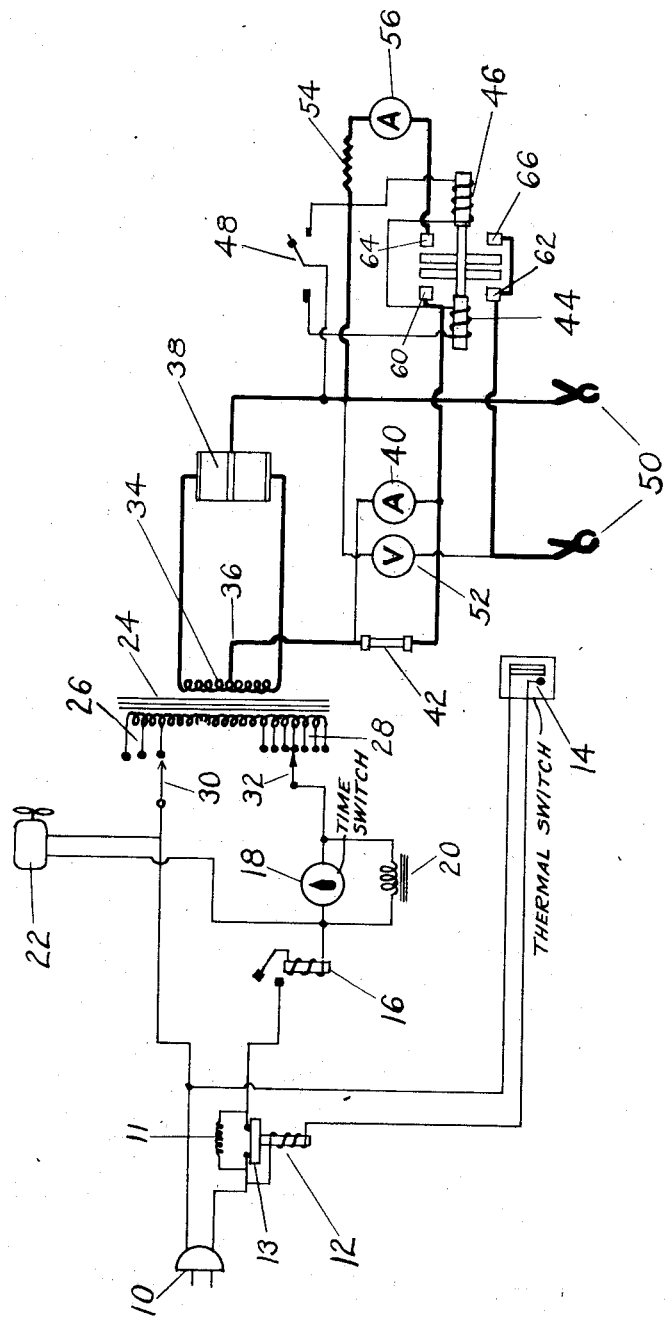
INVENTOR
*Carl E. Peters*
BY
*Roy M. Eilers*
ATTORNEY Patented Aug. 1, 1944

2,354,877

UNITED STATES PATENT OFFICE 2,354,877

BATTERY CHARGER

Carl E. Peters, St. Louis, Mo., assignor to B-L Electric Manufacturing Company, St. Louis, Mo., a corporation of Missouri Application June 4, 1941, Serial No. 396,526

2 Claims. (Cl. 320—5)

This invention relates to improvements in battery chargers. More particularly, the invention relates to improvements in battery chargers that can be used to analyze and charge batteries accurately, safely, and rapidly.

It is an object of the invention to provide an improved battery charger that can be used to analyze and charge batteries accurately, safely, and rapidly.

Battery chargers of various kinds have been known and used for some time. For many years the chargers were of the trickle type and the operator would attach the leads of the charger to the battery and start the charger. The rate of charging was rather low and the length of the charging period was not critical. Because the length of the charging period was not critical, the operator did not have to be exact in selecting the length of time during which the battery was to be charged. Today, however, a new type of battery charger is being evolved. This new battery charger is being evolved in response to a demand for a charger that can renovate automobile batteries while the batteries are in the car. Such a charger would obviate the necessity of removing the worn down battery from the automobile, and inserting a rental battery in its place. To do this, the charger must renovate the battery in a very short time or the motorist will become impatient and ask for a rental battery. The new charger must, therefore, have a very high charging rate. A battery charger that has a high charging rate also has a critical charging period. If the charging operation continues for too long a period, the battery may be injured because of excessive rises in the temperature of the battery. Since the length of the charging period is critical, it is necessary that its determination be quite accurate. In most batteries that have been in use for several months, some sulphation exists on the plates. Before the condition of the battery can be accurately determined, at least a part of this sulphation must be removed. Since the accurate selection of the charging period is predicated on an accurate analysis of the condition of the battery, it is desirable to remove a part of the sulphation. This is done by discharging the battery rapidly for a short period. The condition of the battery can then be analyzed accurately and the proper length of charging period selected. This insures proper charging of the battery. Different manufacturers are working to evolve a really satisfactory battery charger of this type. A few chargers have been designed which do the work fairly well, but none of them are completely satisfactory. One of the chief objections to the battery chargers that are being evolved today, is their use of two separate electrical circuits. These chargers are provided with a discharge circuit that is separate and distinct from the charging circuit. The fact that the battery charger has two separate electrical circuits not only increases the number of parts used in the chargers, but it makes the provision of two sets of electrical leads for the charger necessary. These leads carry heavy currents and have rather large diameters. In addition to having rather large diameters, these leads must be long enough to reach the battery in a car. As a result these leads contain a large amount of copper and are rather expensive. The necessity of having two sets of leads on a battery charger increases the cost of the charger. In addition the two sets of leads increase the problems of the operator who must alternately attach and disconnect the two sets of leads. He must first attach the charging leads to analyze the condition of the battery, then he must disconnect the charging leads, and connect the discharging leads. After the discharging operation is completed the operator must disconnect the discharging lead and connect the charging leads. This complicates the procedure a great deal and makes these chargers objectionable. In addition the changing of the leads may cause some sparking that can be quite dangerous. Where a battery is charged rapidly, it evolves quantities of hydrogen gas. This gas combines with the oxygen in the air to form an explosive mixture. The practice of changing leads frequently, that must be followed on chargers now in use, increases the likelihood of having an explosion since the removal of the clips may cause a sparking that will set off the mixture. These explosions have been found not only to ruin the battery, but to endanger the clothing and skin of the operator. Operators have been severely burned by the acid and have had their clothes eaten away by the acid after such an explosion. Furthermore, having two sets of long leads, doubles the problem of providing for the disposition of the leads when they are not in use. For the above reasons, battery chargers that have two sets of leads are not completely satisfactory. The present invention, on the other hand, provides a new battery charger that can be used to analyze and charge a battery properly and uses only one electrical circuit. This novel charger can, therefore, do the same charging with fewer electrical parts and with only one set of leads. This results in the attainment of a simpler and cheaper battery charger. It is, therefore, an object of the present invention to provide a battery charger having one electrical circuit that can be used to analyze and charge a battery properly.

In charging storage batteries rapidly by using high currents, the temperature of the battery often rises considerably. In some cases, the rise in the temperature of the battery has been so great that dangerously high temperatures have been reached. This is quite objectionable. The invention obviates this objection by providing electro-thermally responsive means for battery chargers that will halt the operation of the charger whenever the temperature of the battery reaches a predetermined level. It is, therefore, an object of the invention to provide electro-thermally responsive means for battery chargers.

Other objects and advantages of the invention will appear from the drawing and accompanying description.

A preferred form of the invention is shown and described in the drawing and accompanying description, but it is to be understood that the drawing and accompanying description do not limit the invention and the invention will be defined by the appended claims.

The drawing is a schematic diagram of the battery charger provided by the invention.

Referring to the drawing in detail, a plug that is arranged to be inserted into a suitable outlet of alternating current and thereby energize the electrical circuit of the charger, is denoted by the numeral 10. A relay that is part of the electrical circuit is denoted by the numeral 12. The operation of this relay 12 is determined by an electro-thermally responsive element 14. This relay 12 may be arranged as shown to interrupt the electrical circuit by inserting a resistance 11 into the circuit. This occurs when the armature 13 is moved out of its closed position. Where desired, the resistance 11 may be dispensed with and the circuit broken completely by actuation of the relay 12. The relay 12 operates to reduce the amount of current flowing through the electrical circuit whenever the temperature of the battery is high enough to actuate the electro-thermally responsive element 14. By interrupting the circuit completely or by reducing the current therein to a low value whenever the temperature in the battery rises to a predetermined level, the relay absolutely prevents further rising of the temperature of the battery. This prevents the occurrence in the battery of dangerously high temperatures. In addition to this safety device, a further protective device may be used. A circuit breaker 16 may be provided to limit the amount of current flowing through the circuit. This circuit breaker limits the current to safe values. A time switch 18 is provided to determine the length of time the device is in operation. This switch 18 is associated with a current reducing choke 20. When the switch 18 is operating, most of the current flows through it, but when the switch 18 is off, the current flows through the choke 20. This choke limits the current to a relatively low value that will not injure the battery. A fan 22 is provided to remove the heat generated by the various parts of the charger, and thereby maintain the temperature of the charger at a safe level. A transformer 24 is provided with a set of taps 26 at one end and a set of taps 28 at the other end. Each set of taps is provided with a selector switch to permit the operator to select the proper number of turns on the primary winding of the transformer. Selector switch 30 is used with taps 26 and selector switch 32 is used with taps 28. The secondary winding 34 of the transformer has the usual leads and a center tap 36. The leads of the secondary winding 34 energize the rectifier 38. This rectifier 38 may be of any suitable type, but is preferably a dry disc rectifier. The center tap 36 of the secondary winding 34 is connected to an ammeter 40 and its shunt 42. It is also connected to the solenoid coils 44 and 46 of a switch operated relay. This relay has an armature 45 that moves under the influence of coil 44 and 46. This armature connects contact 60 with 62 and contact 64 with 66. The operation of this relay is controlled by a selector switch 48. The relay alternately connects the battery clips 50 to the rectifier through voltmeter 52 for charging, or it connects the battery clips to discharge resistor 54 through the voltmeter 52 and ammeter 56 for discharging.

To analyze and charge a battery properly, the operator of a charger must follow a definite procedure. He must first determine the specific gravity of the electrolyte in the various cells of the battery. If the specific gravity of the various cells are all about the same, it is safe to assume that none of the cells are "dead." He then attaches battery clips 50 to the battery terminals. The operator then multiplies the rated ampere hour capacity of the battery by an arbitrary constant. This constant has been set at 86% since this per cent has been found by a number of tests to give the best all-round charging rate. The product of the mulitplication of the rated ampere hour capacity of the battery by the arbitrary constant is equal to a number of amperes. This figure is set on selector switch 32. In practice, the battery charger is actually provided with a coarse selector switch and a fine selector switch, but their operation is the same as the single selector switch 32 shown in the drawing. The time switch 18 is then set for a charging period of five minutes and the selector switch 48 is moved to the charge position. During the charging period, the meters are read very carefully. If the voltmeter gives a reading that is somewhat higher than the rated voltage of the battery, some sulphation probably exists in the battery. This sulphation must be partially eliminated before an accurate analysis can be made and the battery charged properly. The sulphation is removed by alternately charging and discharging the battery with a heavy current. A five minute charging and discharging period is usually sufficient to eliminate enough of the sulphation to permit proper charging of the battery. At the end of the five minute period, the time switch is again set for five minutes but the selector switch 48 is moved to the discharge position. As indicated above, the five minute period is taken only as an example and any period of time may be used. The length of time selected will be determined by the amount of sulphation in the battery. It is desirable, however, for the purpose of securing an accurate analysis of the battery to make the charge and discharge periods equal.

The operator now selects the charging period for the battery by subtracting the reading of the specific gravity of the electrolyte from 1250 and dividing the difference by two. This quotient is set on the time switch 18 and the selector switch 48 is moved to the charge position. The reading of the voltmeter should now be in the neighborhood of the rated voltage of the battery. If it is not, the charge and discharge cycle is repeated to eliminate more of the sulphation. In case the reading of the voltmeter is close to the rated voltage, the charging operation is permitted to go on uninterrupted. At the end of the period set on the time switch 18, the switch 18 will open and the current will flow through current reducing choke 20. This limits the charging current to a low value that cannot injure the battery and prevents the discharging of the battery. It also reduces the rate of generation of gas that occurs when the battery is charged at the high rate.

The current used in this method of charging batteries is quite high and is in the neighborhood of one hundred amperes. Where a battery is charged at this rate, it experiences an appreciable rise in temperature. In some cases this rise in temperature may become dangerous. The invention provides an electro-thermally responsive element 14 that may be inserted in one of the cells of the battery. If the temperature of the battery rises to a predetermined level, the electro-thermally responsive element will bend and permit the actuation of relay 12. The actuation of relay 12 breaks the circuit of the battery charger completely or reduces the rate to a low value that will prevent further rise is the temperature of the battery. When the battery cools down, the electro-thermally responsive element will straighten out and release the relay 12. This will complete the circuit and permit continuance of the charging operation.

Every dry disc rectifier experiences a decrease in capacity as its age increases. To compensate for this decrease in capacity, the battery charger is provided with a transformer that has a number of taps 26. These taps are used to increase the current in the secondary winding as the battery charger gets older. Selector switch 30 is provided to permit selection of the desired current values.

It can be seen from the above that by use of the invention, a battery charger can be made that analyzes a battery properly and can be used to charge the battery accurately, safely, and rapidly.

What I claim is:

1. In a storage battery charger that can be used to analyze and charge storage batteries accurately, safely, and rapidly, the combination of a D. C. battery-charging circuit, a D. C. battery-discharging circuit, a D. C. control circuit, and an A. C. circuit, said A. C. circuit including a current rectifying means and a time switch that is in parallel with a current-limiting resistance and is actuable to insert said current-limiting resistance in said A. C. circuit, said D. C. control circuit including a manually operable switch and a two-solenoid switch, one of the solenoids of said two-solenoid switch being connected to one contact of said manually operable switch, the other of the solenoids of said two-solenoid switch being connected to another contact of said manually operable switch, said manually operable switch being arranged so only one contact thereof is actuable at any one time and so only one of said solenoids is carrying current at any one time, said D. C. battery-charging and discharging circuits having contacts therein, said two solenoid switch having an armature therein that is selectively movable by the solenoids of said two solenoid switch toward the contacts in said D. C. battery-charging and discharging circuits, terminals that are adapted to be secured to the battery being charged, and a discharge resistance in said D. C. battery-discharging circuit, said D. C. battery-charging circuit being adapted to be connected to said terminals by movement of said armature towards the contacts in said D. C. battery-charging circuit, said D. C. battery-discharging circuit being adapted to be connected to said terminals through said discharge resistance by movement of said armature toward the contacts in said D. C. battery-charging circuit, said D. C. battery-discharging circuit being adapted to be connected to said terminals through said discharge resistance by movement of said armature toward the contacts in said battery-discharging circuit, said time switch and said current limiting resistance being arranged to limit the current passing through said charger and thereby permit accurate, safe and rapid analyzing and charging of said battery.

2. In a storage battery charger that can be used to analyze and charge storage batteries accurately, safely, and rapidly, the combination of a D. C. battery charging circuit, a D. C. battery-discharging circuit, a D. C. control circuit and an A. C. circuit, a plurality of battery clamps, said A. C. circuit including a current rectifying means, said D. C. control circuit including a manually operable switch and a two solenoid switch, said two solenoid switch having an armature and a plurality of sets of contacts, said D. C. battery-charging circuit including connections to said current rectifying means and to one of the solenoids of said two solenoid switch and to one of said sets of contacts, said D. C. battery-discharging circuit including a discharge resistance and the other of said solenoids, and the other of said sets of contacts, said armature for said two solenoid switch being selectively movable toward the contacts in said D. C. battery-charging and discharging circuits, said manually operated switch and said two solenoid switch being arranged to energize only one of said solenoids at a time, said battery clamps being connected to said set of contacts in said D. C. battery charging and discharging circuits, said battery charger being arranged so selective movement of said manually operable switch selectively connects said battery clamps with said D. C. battery charging and discharging cricuits.

CARL E. PETERS.